(12) United States Patent
Zhu et al.

(10) Patent No.: US 7,712,912 B2
(45) Date of Patent: May 11, 2010

(54) BACKLIGHT MODULE

(75) Inventors: Jun Zhu, Beijing (CN); He Zhang, Beijing (CN); Guo-Fan Jin, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 17 days.

(21) Appl. No.: 12/187,852

(22) Filed: Aug. 7, 2008

(65) Prior Publication Data

US 2009/0116237 A1    May 7, 2009

(30) Foreign Application Priority Data

Nov. 2, 2007    (CN) .................. 2007 1 0124245.5

(51) Int. Cl.
*G09F 13/04* (2006.01)
*G09F 13/08* (2006.01)

(52) U.S. Cl. .................. 362/97.3; 362/612; 362/621

(58) Field of Classification Search ....... 362/97.1–97.3, 362/245, 249.02, 561, 612, 621; 385/33, 385/35, 45
See application file for complete search history.

(56) References Cited

U.S. PATENT DOCUMENTS 3,923,394 A  * 12/1975 Frankiewicz .................. 355/37

* cited by examiner

*Primary Examiner*—Jason Moon Han
(74) *Attorney, Agent, or Firm*—D. Austin Bonderer

(57) ABSTRACT

A backlight module includes a light guide plate, at least one mixed light apparatus, a first light source and a second light source. The light guide plate includes a body including at least one recess provided at a bottom surface thereof. The mixed light apparatus is disposed partly in or adjacent to the recess. The mixed light apparatus includes a body, a first light reflecting element and a second light reflecting element. The body of the mixed light apparatus has a light emitting surface. Each of the light reflecting elements extends from the light emitting surface. Each of the light reflecting elements has an emanating point and a focal point. The emanating points overlap at the light emitting surface. One of the light sources is disposed at one of the focal points.

19 Claims, 8 Drawing Sheets

BACKLIGHT MODULE

BACKGROUND

1. Technical Field

The invention relates to a backlight module and, particularly, to a backlight module typically used in a liquid crystal display.

2. Description of Related Art

Currently, because liquid crystal displays (LCDs) are thin, lightweight, long lasting, and consume little power, they are extensively used in a variety of electronic devices. However, because LCDs are not self-luminescent, backlight modules are typically required. Generally, the backlight modules can be categorized as either direct-type backlight modules or edge-type backlight modules. Because direct-type backlight modules can provide high illumination in comparison with edge-type backlight modules, direct-type backlight modules are more widely employed in numerous applications.

Referring to FIG. 8, a conventional direct-type backlight module 10 includes a substrate 11, a light source 12 and a diffusion plate 14. The light source 12 is disposed on the substrate 11. The light source 12 can employ a plurality of point light sources (e.g. light emitting diode, LED) or a linear light source (e.g. cold cathode fluorescent lamp, CCFL). An LED array is extensively employed as the light source 12 for LCDs because the LED is resistant from mercury pollution, while exhibiting qualities of high color saturation and longevity. The diffusion plate 14 is disposed above the substrate 11 for allowing light emitted from the light source 12 to be uniform and providing light for an associated display panel.

The LED array consists of a plurality of red LEDs 12a, green LEDs 12b and blue LEDs 12c. The LEDs 12a, 12b, 12c are uniformly distributed on the substrate 11 according to the color of emitted light. Particularly, rows of red LEDs 12a, green LEDs 12b, and blue LEDs 12c are arranged in alternating fashion. Red, green, and blue light, is emitted from the light source 12 and mixed continuously until reaching the diffusion plate 14 to produce white light. A predetermined distance between the light source 12 and the diffusion plate 14 is required for mixing the emitted light and providing uniform illumination.

Because of a recent increase in demand for thin and lightweight LCDs, the distance provided for mixing emitted light has shortened, resulting in poor mixing, thereby producing a yellowish-blue light rather than the intended white light.

In addition, when a large number of red, green and blue LEDs are utilized for a large-scale LCD production, the white light emitted from such an LCD has low energy and color saturation. Moreover, the color of the mixed light in such manner cannot be adjusted as desired.

What is needed, therefore, is a backlight module that can effectively display compact applications and which provides adjustable color light with improved color saturation, improved uniformity, and high energy.

BRIEF DESCRIPTION OF THE DRAWINGS

The components in the drawings are not necessarily drawn to scale, the emphasis instead being placed upon clearly illustrating the principles of the present backlight module. In the drawings, all the views are schematic.

Figure 1:
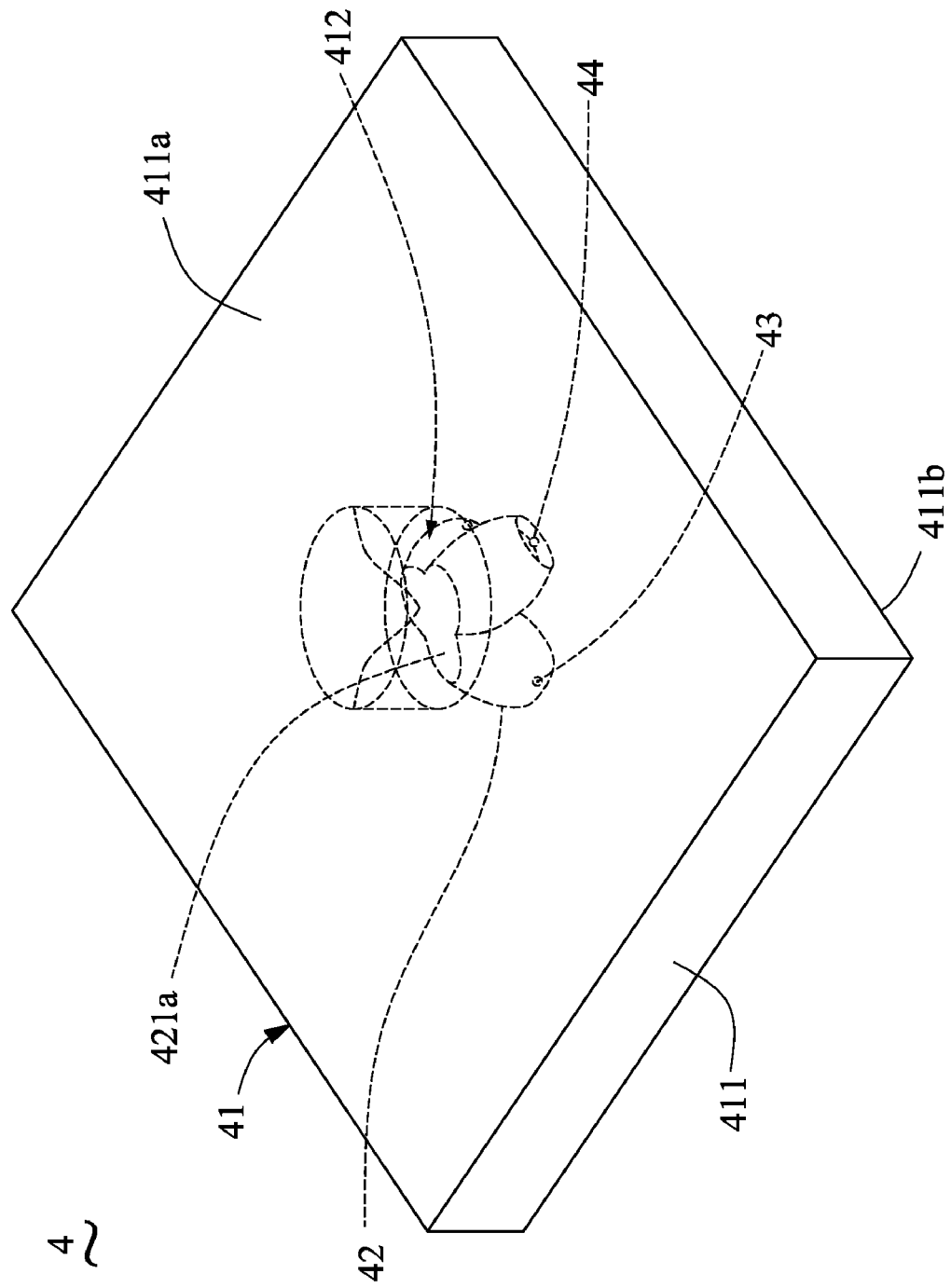
FIG. 1 is an isometric view of a backlight module in accordance with a first exemplary embodiment.

Corresponding reference characters indicate corresponding parts. The exemplifications set out herein illustrate at least three preferred or exemplary embodiments of the present backlight module, in various forms, and such exemplifications are not to be construed as limiting the scope of the invention in any manner.

DETAILED DESCRIPTION OF EXEMPLARY EMBODIMENTS

References will now be made to the drawings to describe various exemplary embodiments of the present backlight module in detail.

Referring to FIG. 1, a backlight module 4 according to a first exemplary embodiment is shown. The backlight module 4 includes a light guide plate 41, at least one mixed light apparatus 42, a first light source 43 and a second light source 44. In the illustrated exemplary embodiment, the mixed light apparatus 4 is configured for mixing the light emitted from the first light source 43 and the second light source 44. Typically, the backlight module 4 is configured for use in an LCD device (not shown).

Figure 2:
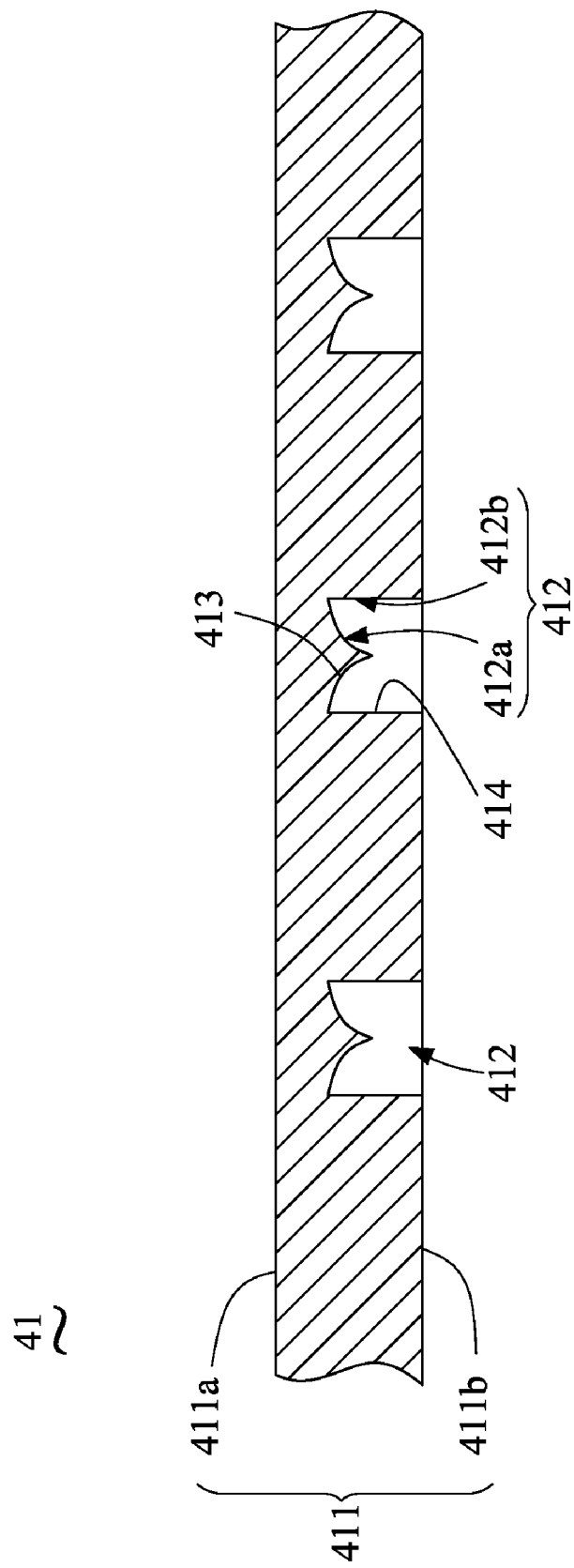
FIG. 2 is a cross-sectional view of a light guide plate of the backlight module of the first exemplary embodiment.

Referring to FIG. 1 and FIG. 2, the light guide plate 41 includes a body 411 having a top light output surface 411a, a lateral surface, and a bottom surface 411b. The lateral surface interconnects the top light output surface 411a and the bottom surface 411b, and the bottom surface 411b is parallel to the top light output surface 411a so as to form the sheet-shaped light guide plate 41. The body 411 of the light guide plate 41 includes at least one recess 412. In the illustrated exemplary embodiment, the body 411 has a plurality of recesses 412, as an example, as shown in FIG. 2. The light guide plate 41 is made of transparent material, such as glass or polymethyl methacrylate (PMMA).

The recesses 412 are provided at the bottom surface 411b of the body 411 of the light guide plate 41. Referring also to FIG. 2, the recesses 412 are receptacle-like structures set in from the bottom surface 411b of the light guide plate 41 and act as light receiving areas. Advantageously, the recesses 412 are generally cylindrical. Alternatively, the recesses 412 may be generally frustum-shaped. In the illustrated embodiment, the body 411 of the light guide plate 41 includes a top conical protrusion 413, which protruding down into the recess 412. The top protrusion 413 has a reflective surface 412a. Additionally, each of the recesses 412 has a peripheral side wall 414 surrounding a periphery of the top protrusion 413 serves as an incident surface 412b. The reflective surface 412a adjoins the incident surface 412b.

The reflective surface 412a of the protrusion 413 is configured to reflect light from the mixed light apparatus 42 to the incident surface 412b of the peripheral side wall 414. Particularly, the reflective surface 412a can be coated with reflective material. The reflective material chosen for coating the reflective surface 412a is dependent on the reflective efficiency that must be achieved in practice.

In the illustrated embodiment, a central cross-section of the conical protrusion 413 of each of the recesses 412 defines two symmetrically opposite, concave lines. The lines can, for example, be arc-shaped. When light strikes the curved reflective surface 412a of the protrusion 413, it is reflected onto the incident surface 412b and enters the body 411 of the light guide plate 41. The shapes of the recess 412 and the protrusion 413 are not limited to what is described above and illustrated. Any suitable shapes that allow the reflective surface 412a to redirect light into the light guide plate 41 using the incident surface 412b may be employed.

Figure 3:
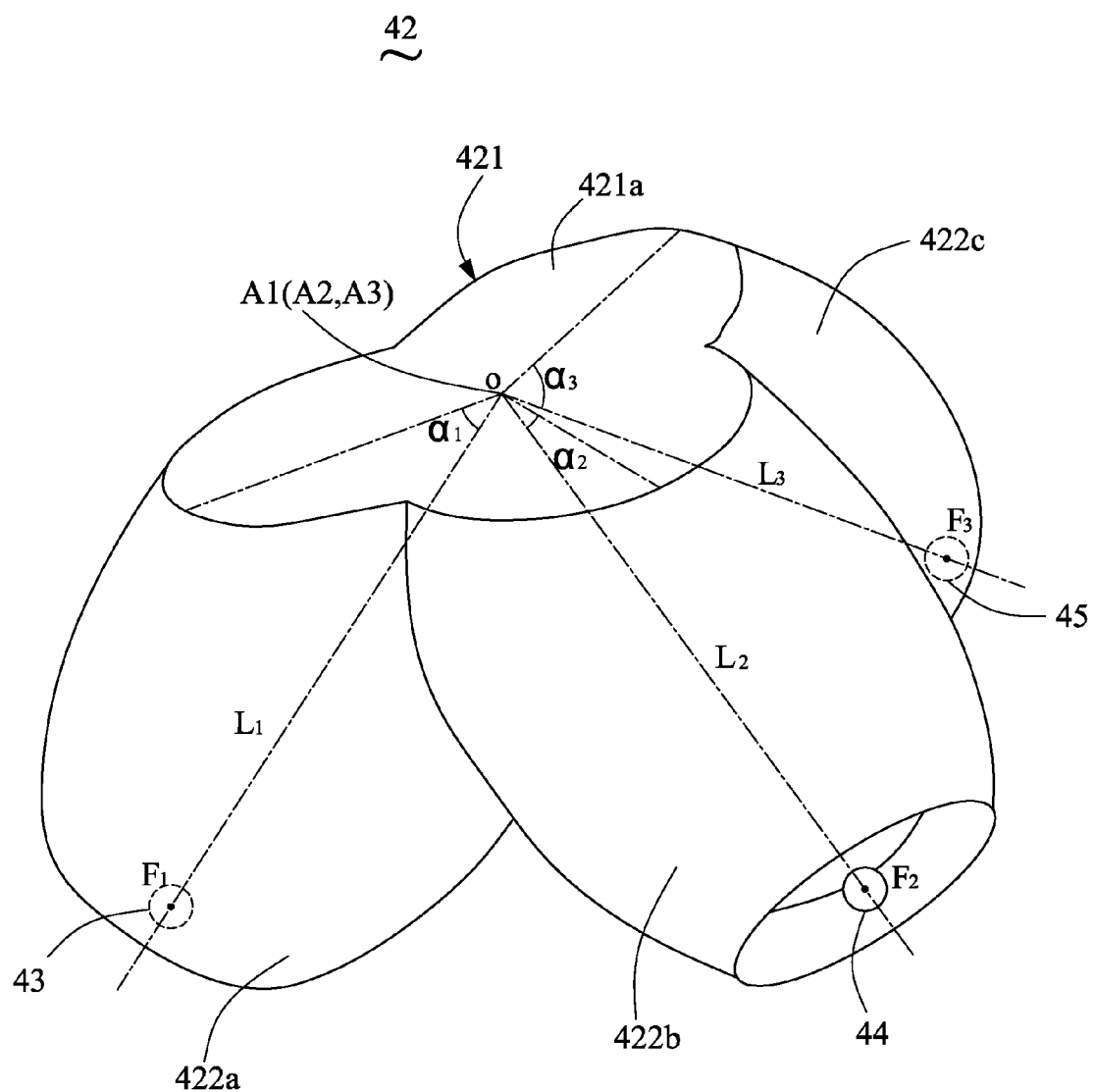
FIG. 3 is an isometric view of a mixed light apparatus of the backlight module of the first exemplary embodiment.

The mixed light apparatus 42 is disposed at least partly in or adjacent to the recess 412 of the light guide plate 41, as shown in FIG. 1. The mixed light apparatus 42 is configured for mixing light emitted from at least two light sources, e.g. the first light source 43 and the second light source 44. Referring to FIG. 3, the mixed light apparatus 42 includes a body 421 and at least two light reflecting elements 422a, 422b. The light sources 43, 44 are disposed corresponding to the light reflecting elements 422a, 422b, respectively.

Figure 4:
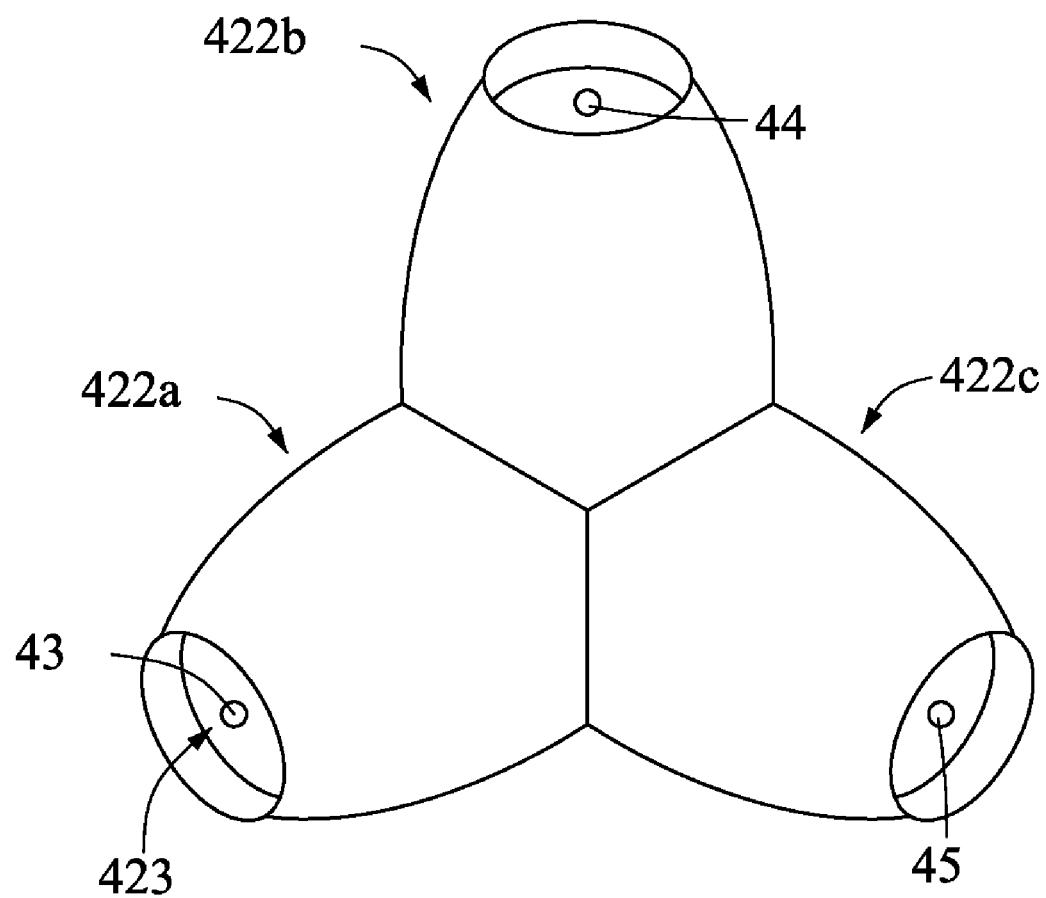
FIG. 4 is an isometric view from below of the mixed light apparatus of FIG. 3.

Referring to FIG. 3 and FIG. 4, in the illustrated embodiment, the mixed light apparatus 42 includes three light reflecting elements, i.e. a first light reflecting element 422a, a second light reflecting element 422b and a third light reflecting element 422c. In addition, three light sources, i.e. the first light source 43, the second light source 44 and a third light source 45, are disposed in correspondence with each of the light reflection elements. In the present exemplary embodiment, each of the light reflection elements is a solid oval-shaped body. As such, the light reflection elements can be made of a material, such as glass or polymethyl methacrylate (PMMA).

The body 421 of the mixed light apparatus 42 has a light emitting surface 421a. The first light reflection element 422a extends from the light emitting surface 421a. The first light reflection element 422a has a first emanating point $A_1$ and a first focal point $F_1$. The first light source 43 is disposed at the first focal point $F_1$. In addition, the first emanating point $A_1$ and the first focal point $F_1$ are on a first axis $L_1$.

The second light reflection element 422b is adjacent to the first light reflection element 422a and extends from the light emitting surface 421a. The second light reflection element 422b has a second emanating point $A_2$ and a second focal point $F_2$. The second light source 44 is disposed at the second focal point $F_2$. In addition, the second emanating point $A_2$ and the second focal point $F_2$ are on a second axis $L_2$.

The third reflection element 422c extends from the light emitting surface 421a. The third light reflection element 422c has a third emanating point $A_3$ and a third focal point $F_3$. The third light source 45 is disposed at the third focal point $F_3$. Additionally, the third emanating point $A_3$ and the third focal point $F_3$ are on a third axis $L_3$.

As mentioned above, the first emanating point $A_1$, the second emanating point $A_2$ and the third emanating point $A_3$ overlap and converge on the light emitting surface 421a. Specifically, the first axis $L_1$, the second axis $L_2$ and the third axis $L_3$ meet at a common point O. The common point O is defined on the light emitting surface 421a. $\alpha_1$, $\alpha_2$ and $\alpha_3$ are inclined angles of the axes $L_1$, $L_2$, $L_3$ and the light emitting surface 421a, respectively. Such inclined angles $\alpha_1$, $\alpha_2$, $\alpha_3$ approximately range from 40 to 70 degrees. Suitably, $\alpha_1$, $\alpha_2$ and $\alpha_3$ are approximately 60 degrees. Moreover, angles between the first axis $L_1$, the second axis $L_2$ and the third axis $L_3$ can be approximately equal to each other.

The light emitting surface 421a is disposed at the ends of the axes L1, L2, L3 opposite to the light sources 43, 44, 45. The light emitting surface 421a can be a planar surface. It is to be understood that shape of the light emitting surface 421a is not limited to what is mentioned above. Alternatively, the light emitting surface 421a can be a curved surface. Each of the light sources 43, 44, 45 can be a light-emitting diode (LED), such as single-color LED or multi-color LED. In the present exemplary embodiment, the first light source 43 is a red LED. The second light source 44 is a green LED. The third light source 45 is a blue LED.

Figure 5:
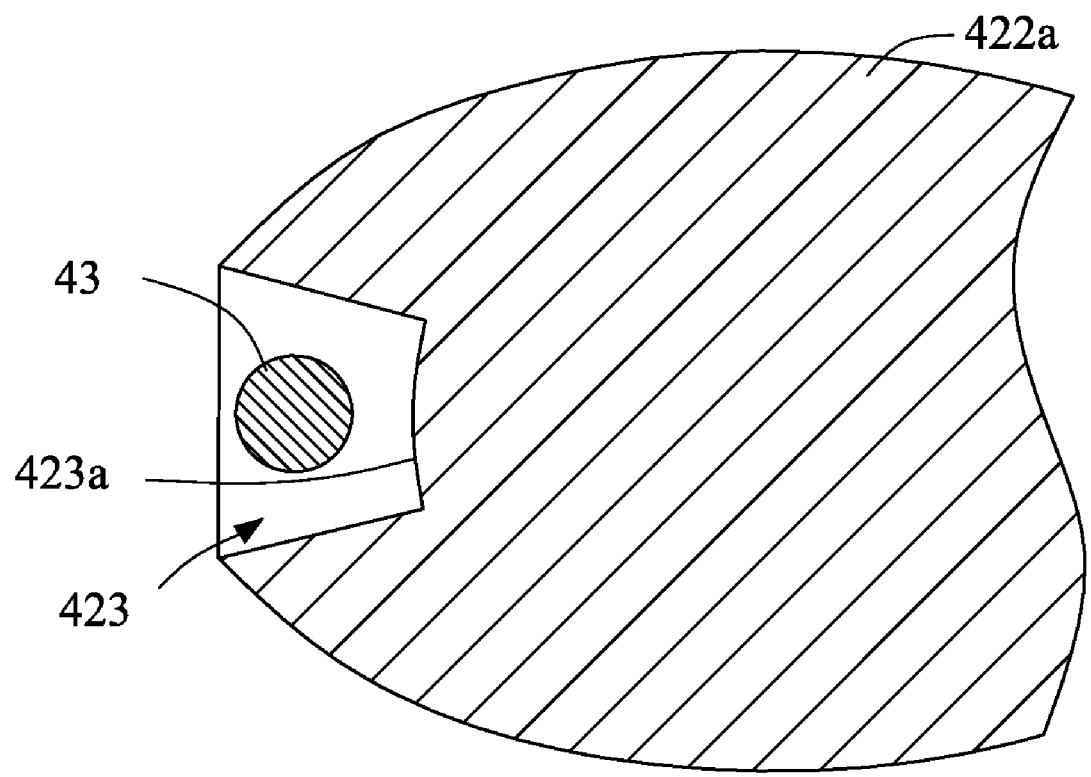
FIG. 5 is a cross-sectional view of one of the light reflecting elements of the mixed light apparatus of the first exemplary embodiment.

Referring to FIG. 3 and FIG. 4, each of the light reflection elements 422a, 422b, 422c includes a concave structure 423 disposed at one end thereof where the light source 43, 44 or 45 is correspondingly located. The concave structure 423 is configured to contain the light source 43, 44 or 45 disposed at the focal point $F_1$, $F_2$, or $F_3$. Referring to FIG. 5, the schematic cross-sectional view of the first light reflection element 422a is shown. For example, the concave structure 423 can generally be cylindrical or conical. Additionally, the concave structure 423 has a spherical bottom 423a. The curvature radius of the spherical bottom 423a approximately ranges from 2.6 to 3.5.

Referring to FIG. 1, FIG. 2 and FIG. 3, the mixed light apparatus 42 is contained within, at least partially, the recess 412 in alignment with the protrusions 413 and generally flush with the bottom surface 411b. Particularly, the light emitting surface 421a of the mixed light apparatus 42 is configured to face the reflective surface 412a of the protrusion 413. The mixed light apparatus 42 is sized to be partially contained in the recess 412 of the light guide plate 41. Thus, light issued from the different light sources 43, 44, 45 travels in the mixed light apparatus 42. Then, different colored lights converge at the common point O, where the light mixes to produce white light. The white light emitted by the mixed light apparatus 42 has high color saturation, improved uniformity, and high energy. The mixed light, i.e. the desired white light, will emit from the light emitting surface 421a and be reflected by the reflective surface 412a of recess 412 into the light guide plate 41 via the incident surface 412b.

Figure 6:
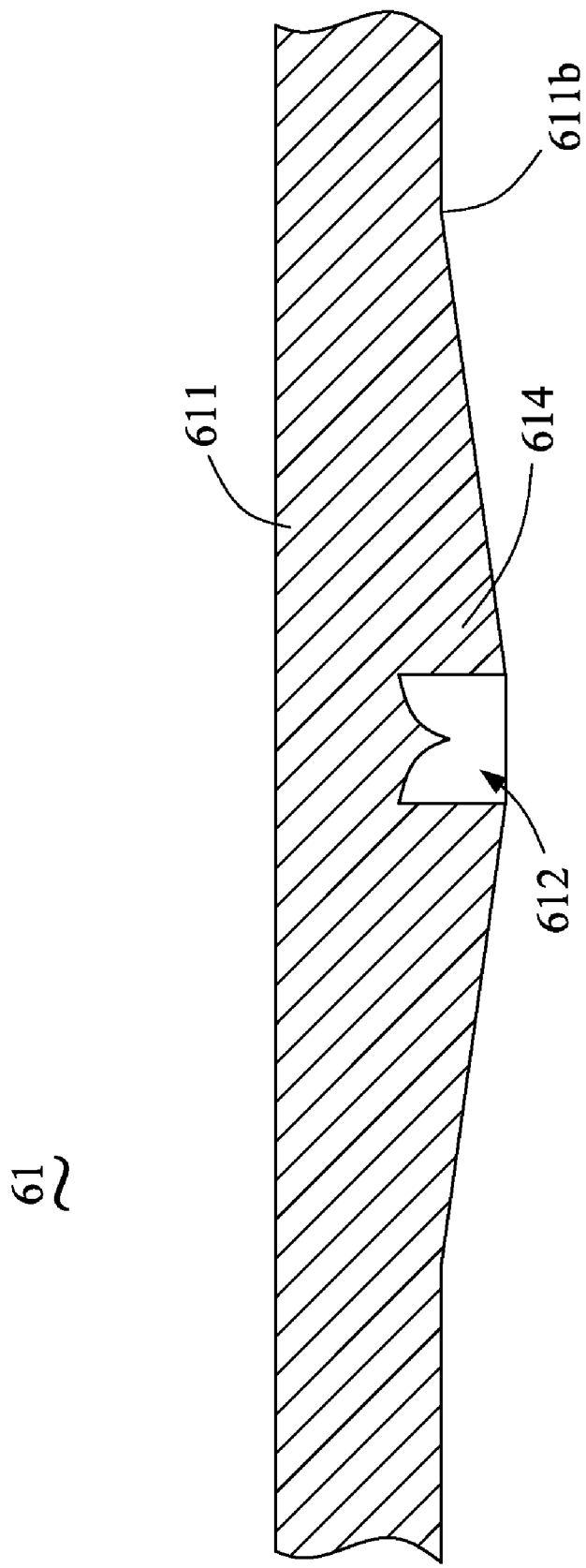
FIG. 6 is a cross-sectional view of a light guide plate of a backlight module in accordance with a second exemplary embodiment.

Referring to FIG. 6, a backlight module according to a second exemplary embodiment is shown. However, the backlight module of the present exemplary embodiment is similar to the backlight module 4 illustrated above. The difference is that a body 611 of light guide plate 61 has at least one bulge 614 at a bottom surface 611b of the light guide plate 61. Additionally, at least one recess 612 of the present exemplary embodiment is defined at the bottom surface 611b at a middle of the bulge 614, as shown in FIG. 6. In the present exemplary embodiment, the bulge 614 is integrated with the body 611 of the light guide plate 61. Alternatively, the bulge 614 can be separately formed and adhered to the body 611 of the light guide plate 61. In the illustrated exemplary embodiment, the bulge 614 is in the shape of a very shallow truncated circular cone.

Figure 7:
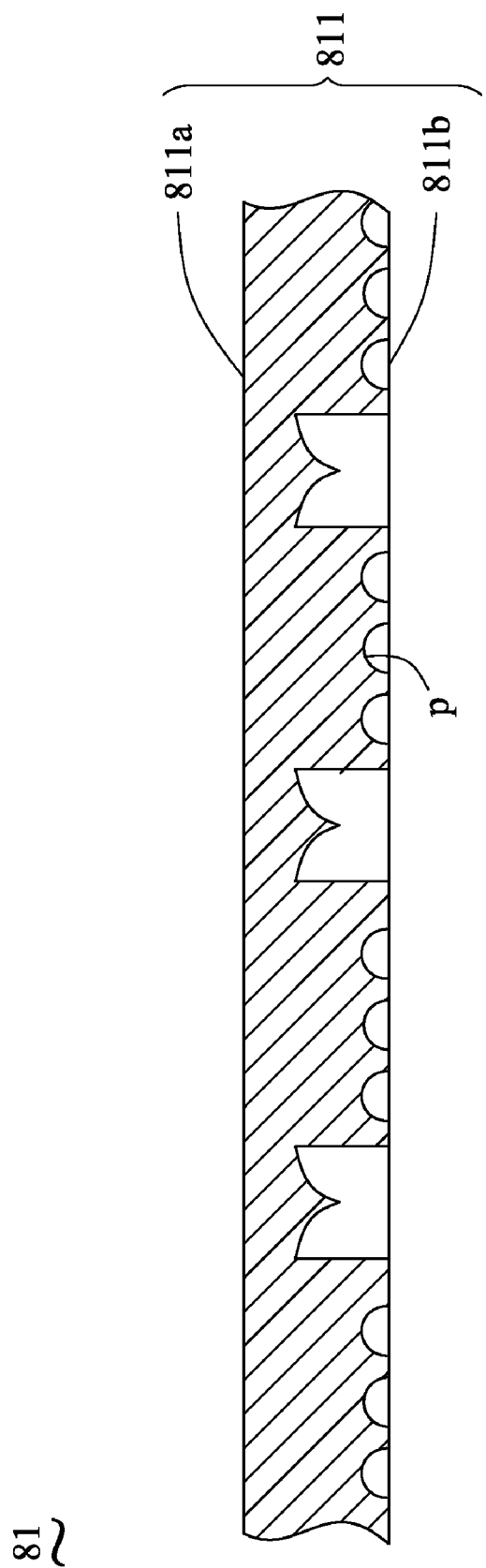
FIG. 7 is a cross-sectional view of a light guide plate of a backlight module in accordance with a third exemplary embodiment.
Figure 8:
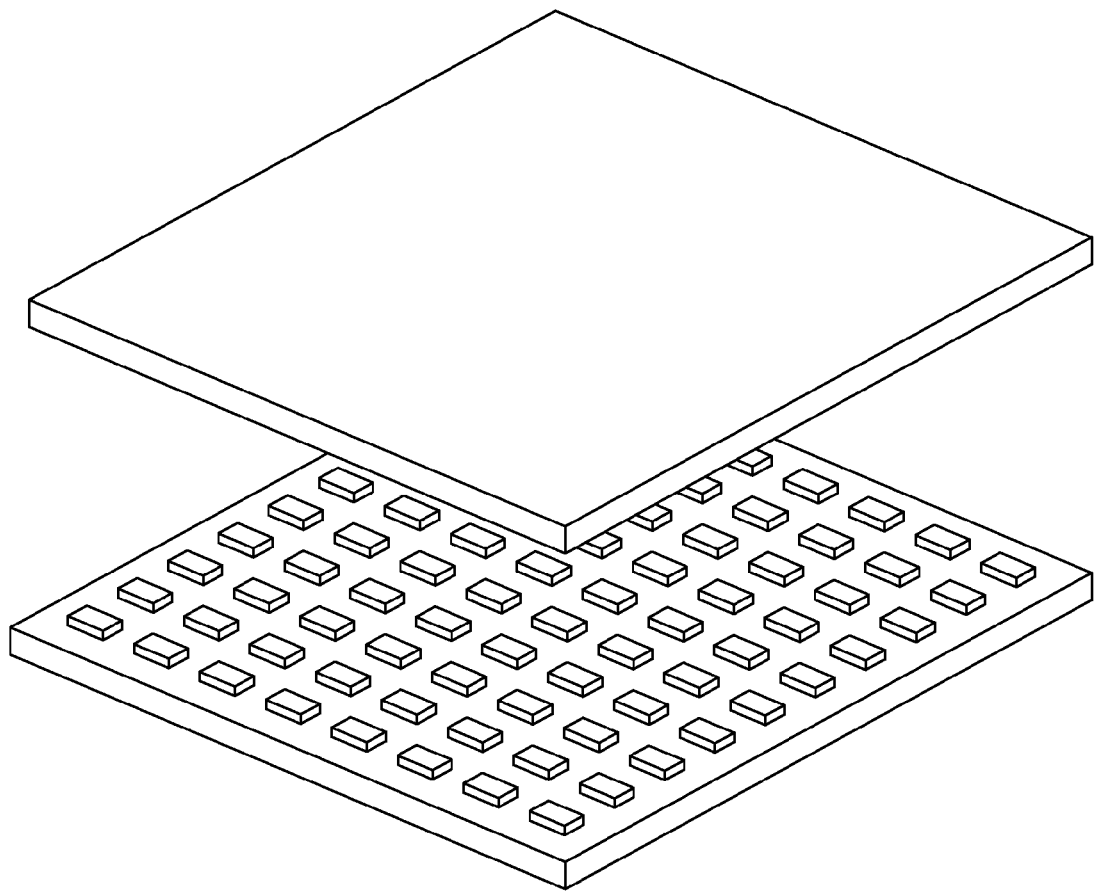
FIG. 8 is an exploded view of a conventional direct-type backlight module.

Referring to FIG. 7, a backlight module according to a third exemplary embodiment is shown. However, the backlight module of the present exemplary embodiment is similar to the backlight module 4 illustrated above. The difference is that a body 811 of the light guide plate 81 further includes a scattering dot array P disposed at the bottom surface 811b. The scattering dot array P includes a plurality of dots arranged at the bottom surface 811b in a regular pattern. The scattering dot array P is configured to scatter light propagating within the body 811, and thereby uniformly transmit the light to a light output surface 811a of the light guide plate 811. In the illustrated exemplary embodiment, the dots are in the form of recesses. In order to enhance reflection efficiency, the bottom surface 811*b* and exposed surfaces of the dots can be coated with highly reflective material.

Finally, it is to be understood that the above-described exemplary embodiments are intended to illustrate rather than limit the invention. Variations may be made to the exemplary embodiments without departing from the spirit of the invention as claimed. The above-described exemplary embodiments illustrate the scope of the invention but do not restrict the scope of the invention.

What is claimed is:

1. A backlight module, comprising:
   a light guide plate comprising a body including a top light output surface and a bottom surface, the body of the light guide plate comprising at least one recess provided at the bottom surface;
   at least one mixed light apparatus disposed at least partly in or adjacent to the at least one recess, the at least one mixed light apparatus comprising:
      a body having a light emitting surface;
      a first light reflecting element extending from the light emitting surface, the first light reflecting element having a first emanating point and a first focal point; and
      a second light reflecting element extending from the light emitting surface, the second light reflecting element having a second emanating point and a second focal point, wherein the first emanating point and the second emanating point overlap at the light emitting surface;
      a first light source disposed at the first focal point; and
      a second light source disposed at the second focal point.

2. The backlight module as claimed in claim 1, wherein the at least one recess is generally cylindrical or frustum-shaped.

3. The backlight module as claimed in claim 1, wherein the body of the light guide plate further comprising at least one protrusion protruding down into the at least one recess, and the at least one recess has a peripheral side wall surrounding the protrusion.

4. The backlight module as claimed in claim 3, wherein the protrusion has a reflective surface, and the peripheral side wall serves as an incident surface of the body of the light guide plate.

5. The backlight module as claimed in claim 4, wherein the light emitting surface of the at least one mixed light apparatus faces the reflective surface of the protrusion.

6. The backlight module as claimed in claim 3, wherein the protrusion is generally conical.

7. The backlight module as claimed in claim 1, wherein the body of the light guide plate has a scattering dot array disposed at the bottom surface.

8. The backlight module as claimed in claim 1, wherein the body of the light guide plate further comprises at least one bulge at the bottom surface, the at least one recess being disposed at a center of the at least one bulge.

9. The backlight module as claimed in claim 1, wherein at least one of the light reflecting elements is a solid oval-shaped body.

10. The backlight module as claimed in claim 1, wherein the first emanating point and the first focal point are on a first axis, and the second emanating point and the second focal point are on a second axis.

11. The backlight module as claimed in claim 10, wherein a first inclined angle of the first axis and the light emitting surface or a second inclined angle of the second axis and the light emitting surface ranges from approximately 40 degrees to 70 degrees.

12. The backlight module as claimed in claim 11, further comprising:
    a third light reflecting element extending from the light emitting surface, the third light reflecting element having a third emanating point and a third focal point, the third emanating point, the first emanating point and the second emanating point overlap; and
    a third light source disposed at the third focal point.

13. The backlight module as claimed in claim 12, wherein the third emanating point and the third focal point are on a third axis.

14. The backlight module as claimed in claim 13, wherein a third inclined angle of the third axis and the light emitting surface ranges from approximately 40 degrees to 70 degrees.

15. The backlight module as claimed in claim 14, wherein the first inclined angle, the second inclined angle, and the third inclined angle are approximately 60 degrees.

16. The backlight module as claimed in claim 1, wherein at least one of the light reflecting elements comprises a concave structure disposed corresponding to one of the first focal point and the second focal point.

17. The backlight module as claimed in claim 16, wherein one of the first light source and the second light source is accommodated in one of the concave structures of the first light reflecting element and the second light reflecting element.

18. The backlight module as claimed in claim 17, wherein one of the concave structures is generally cylindrical or conical and has a spherical bottom.

19. The backlight module as claimed in claim 1, wherein the light emitting surface is a planar surface.

* * * * *